United States Patent [19]

Yamamoto et al.

[11] Patent Number: 5,460,746

[45] Date of Patent: Oct. 24, 1995

[54] TERMINAL-MODIFIED IMIDE OLIGOMER COMPOSITION

[75] Inventors: Shinji Yamamoto; Kazuyoshi Fujii; Takefumi Taga, all of Hirakata, Japan

[73] Assignee: UBE Industries, Ltd., Yamaguchi, Japan

[21] Appl. No.: 94,548

[22] Filed: Jul. 20, 1993

[30] Foreign Application Priority Data

Jul. 20, 1992 [JP] Japan ................. 4-234027

[51] Int. Cl.⁶ ................. C09K 3/00; C08F 283/04
[52] U.S. Cl. ................. 252/183.11; 252/182.19; 525/421; 525/422
[58] Field of Search ................. 252/182.19, 183.11; 525/421, 422

[56] References Cited

U.S. PATENT DOCUMENTS

| | | | |
|---|---|---|---|
| 3,803,081 | 4/1974 | Lubowitz | 525/422 |
| 4,338,430 | 7/1982 | Edelman | 528/222 |
| 4,393,188 | 7/1983 | Takahashi et al. | 525/422 |
| 4,921,745 | 5/1990 | Mitsui et al. | 428/118 |
| 4,931,540 | 6/1990 | Mueller et al. | 528/353 |
| 4,963,645 | 10/1990 | Inoue et al. | 528/342 |
| 4,987,207 | 1/1991 | Yamaya | 528/170 |
| 5,036,111 | 7/1991 | Senneron et al. | 525/422 |
| 5,064,934 | 11/1991 | Mercier et al. | 528/220 |
| 5,128,444 | 7/1992 | Inoue et al. | 528/353 |
| 5,135,815 | 8/1992 | Manos | 428/458 |
| 5,145,916 | 9/1992 | Yamamoto et al. | 525/421 |
| 5,145,943 | 9/1992 | Li et al. | 528/353 |
| 5,241,018 | 8/1993 | Yamamoto et al. | 525/426 |

*Primary Examiner*—Edward A. Miller
*Attorney, Agent, or Firm*—Burgess, Ryan & Wayne

[57] ABSTRACT

A terminal modified imide oligomer fusible at a relatively low temperature and usable for prepregs free from solvent or as a hot melt-type binder, includes (A) an unsaturated imide compound prepared by a reaction of a substituted nadic anhydride with an aromatic diamine and provided with terminal unsaturated hydrocarbon groups and imide groups located in inside portions of the compound molecule and (B) a terminal modified imide oligomer prepared by a reaction of (a) a carboxylic acid component comprising (i) 2,3,3',4'-biphenyltetracarboxylic anhydride and (ii) a substituted or unsubstituted nadic anhydride, with (b) a diamine component comprising at least one aromatic diamine, provided with terminal unsaturated hydrocarbon groups and imide groups located in inside portions of the oligomer molecule and having a logarithmic viscosity number of 0.03 to 1.0, determined in a concentration of 0.5 g/100 ml in N-methyl-2-phyrrolidone at 30° C.

9 Claims, No Drawings

TERMINAL-MODIFIED IMIDE OLIGOMER COMPOSITION

BACKGROUND OF THE INVENTION

1. Field of the Invention

The present invention relates to a terminal modified imide oligomer composition. More particularly, the present invention relates to a composition comprising an unsaturated imide compound and a terminal modified aromatic imide oligomer.

The terminal-modified imide oligomer composition of the present invention is easily fusible at a relatively low temperature and thus can be impregnated in a fiber material without using a solvent. Namely, the terminal-modified imide oligomer composition of the present invention is useful as a resinous material to be impregnated in a fiber material by a hot melt impregnating method for producing prepregs. The resultant prepregs are easily laminated on and bonded to each other by only light heating. The resultant prepregs are free from solvent and are thus safer than conventional solvent-containing prepregs. Also, the prepregs can be easily handled and are usable as a matrix for producing various composite materials. Also, the terminal-modified imide oligomer composition of the present invention is useful as a resinous material for producing various shaped articles and a hot melt binder.

2. Description of the Related Art

It is known that polyimide resin has a superior heat-resistance and thus is useful as a matrix resinous material for shaped resin articles and fiber-reinforced composite resin materials.

Recently, Japanese Unexamined Patent Publication (Kokai) Nos. 59-167,569, 60-250,030 and 60-260,624 disclose various addition reaction type polyimide resins (imide oligomers) which are reaction products of (a) pyromellitic dianhydride with (b) an aromatic diamine and (c) unsaturated reactive compound, have unsaturated terminal groups. These polyimide resins (imide oligomers) are usable as a resinous material for prepregs. A large number of these polyimide resins are, however, disadvantageous in low solubility in organic solvents, high difficulty in impregnation in reinforcing fiber material, and a high melting point which causes a resultant shaped article produced by a melt-shaping process to be heat-deteriorated.

Also, it is known that conventional imide oligomer resins have an unsatisfactory curing property, and thus need a long time for gelation thereof. Also, after curing, a certain amount of non-reacted curable groups remain in the resultant cured resin, and thus the cured resin does not exhibit a satisfactory mechanical strength. Also, when the conventional imide oligomer resins are used as a matrix resin for the preparation of prepregs, the conventional matrix resin exhibits an unsatisfactory affinity with reinforcing fibers and thus an interfacial separation easily occurs between the matrix resin and the reinforcing fibers. Various attempts have been made to solve the above-mentioned problems, and Japanese Unexamined Patent Publication (Kokai) Nos. 1-54,029, 1-54,030, 1-139,632, 1-247,430, 2-64,157, 2-64,136, 2-284,923, 3-174,427 and 4-363,360 disclose various inventions directed to terminal-modified imide oligomers.

Those terminal modified imide oligomers are successful in solving some of the above-mentioned problems. However, those oligomers are still disadvantageous in that they cannot be easily impregnated in a fiber material by a hot melt process, and thus the process for incorporating the terminal-modified imide oligomers into the fiber material is unsatisfactory even if the resultant composite material has a high heat-resistance.

SUMMARY OF THE INVENTION

An object of the present invention is to provide a terminal modified imide oligomer composition which is curable by an addition polymerization and useful for forming prepregs without employing an organic solvent, the prepregs are useful for producing composite materials having a high mechanical strength and a superior heat resistance.

Another object of the present invention is to provide a terminal modified imide oligomer composition useful for producing shaped articles by a hot melt shaping method.

The above-mentioned objects can be attained by the terminal-modified imide oligomer composition of the present invention which comprises:

(A) 100 parts by weight of an unsaturated imide compound consisting of a reaction product of a substituted nadic anhydride with an aromatic diamine and provided with unsaturated hydrocarbon groups located at terminals of the compound molecule and an imide group located in an inside portion of the compound molecule; and (B) 30 to 200 parts by weight of a terminal-modified imide oligomer consisting of a polymerization and imidization product of (a) a carboxylic acid component comprising (i) a first acid ingredient comprising at least one 2,3,3',4'-biphenyltetracarboxylic acid component and (ii) a second acid ingredient comprising at least one member selected from the group consisting of nadic anhydride and substituted nadic anhydrides, with (b) a diamine component comprising at least one aromatic diamine, provided with unsaturated hydrocarbon groups located at the terminals of the oligomer molecule and at least one imide group located in at least one inside portion of the oligomer molecule, and having a logarithmic viscosity number of 0.03 to 1.0 determined in a concentration of 0.5 g/100 ml in a solvent consisting of N-methyl-2-pyrrolidone at a temperature of 30° C.

DESCRIPTION OF THE PREFERRED EMBODIMENTS

The terminal-modified imide oligomer composition of the present invention comprises 100 parts by weight of a specific unsaturated imide compound (A) and 30 to 200 parts by weight of a specific terminal-modified imide oligomer (B).

The unsaturated imide compound (A) consists of a reaction product of a substituted nadic anhydride with an aromatic diamine, and is provided with unsaturated hydrocarbon groups, particularly ethylenically unsaturated hydrocarbon groups located at terminals of the compound molecule and imide groups located in inside portions of the compound molecule.

The unsaturated imide compound (A) is produced, for example, by the process as described below.

In this process, a substituted nadic anhydride having 1 to 6 substituents is reacted with an aromatic diamine in an amount corresponding to about ½ of the molar amount of the substituted nadic anhydride in a reaction medium consisting of at least one organic solvent at a temperature of 100° C. or less, preferably 80° C. or less for 1 to 120 minutes to provide an amide acid compound. The amide acid compound is subjected to a dehydration-imidization procedure in which ($a_1$) the amide acid compound is treated with an imidizing agent, for example, acetic anhydride, at a relatively low temperature of 0° C. to 140° C. or (b) the amide acid compound is heated at a high temperature of 150° C. to 200° C. for 5 to 180 minutes, and the reaction product is cooled to room temperature.

The resultant unsaturated compound is provided with the terminal unsaturated hydrocarbon groups corresponding to the double bond in the substituted nadic anhydride molecule, and inside imide groups.

The resultant reaction mixture of the above-mentioned process can be used for the production of the terminal-modified imide oligomer (B). If necessary, the resultant reaction mixture is concentrated or diluted.

In the reparation of the unsaturated imide compound (A), the substituted nadic anhydride has at least one substituent selected from lower alkyl groups having 1 to 6 carbon atoms, alkoxyl groups, halogenated hydrocarbon groups, and halogen atoms, and attached to a norbornene structure of a nadic anhydride molecule at at least one position other than 2- and 3-positions thereof.

Preferably, the substituted nadic anhydride is selected from the group consisting of alkyl group-substituted nadic anhydrides, for example, methyl-5-norbornene-2,3-dicarboxylic anhydride and ethyl-5-norbornene-2,3-dicarboxylic anhydride; alkoxyl group-substituted nadic anhydrides, for example, methoxy-5-norbornene-2,3-dicarboxylic anhydride; halogenated hydrocarbon group-substituted nadic anhydrides, for example, trifluoromethyl-5-norbornene-2,3-dicarboxylic anhydride, and halogen atom-substituted nadic anhydrides, for example, fluoro-5-norbornene-2,3-dicarboxylic anhydride and chloro-5-norbornene-2,3-dicarboxylic anhydride.

The aromatic diamine usable for the preparation of the unsaturated imide compound (A) is selected from aromatic diamine compounds having one or more aromatic ring structures, for example, benzene ring structures.

These aromatic diamine compounds include the following compounds.

(I) Aromatic diamine compounds having one aromatic ring structure
  (1) Phenylene diamine compounds
  (2) Xylene diamine compounds
  (3) Diamino-trialkyl benzene compounds
(II) Aromatic diamine compounds having two aromatic ring structures
  (1) Benzidine compounds
  (2) Diaminodiphenylether compounds
  (3) Diaminodiphenylthioether compounds
  (4) Diaminobenzophenone compounds
  (5) Diaminodiphenylsulfine compounds
  (6) Diaminodiphenylsulfide compounds
  (7) Diaminodiphenylsulfone compounds
  (8) Diaminodiphenylalkane compounds
(III) Aromatic diamine compounds having three aromatic ring structures
  (1) Bis(aminophenoxy)benzene compounds
(IV) Aromatic diamine compounds having four aromatic ring structures
  (1) Bis[(aminophenoxy)phenyl]propane compounds
  (2) Bis(aminophenoxy)diphenylsulfone compounds Preferably, the aromatic diamine having 1 to 4 aromatic ring structures for the unsaturated imide compound (A) is selected from the group consisting of phenylenediamine compounds, for example, 1,3-phenylenediamine and 1,4-phenylenediamine; diaminodiphenylether compounds, for example, 3,4'-diaminodiphenylether, 3,3'-diaminodiphenylether and 4,4'-diaminodiphenylether; diaminodiphenylalkane compounds, for example, 3,3'-diaminodiphenylmethane, 4,4'-diaminodiphenylmethane, 3,4'-diaminodiphenylmethane, 2,2-bis(3-chloro-4-aminophenyl)propane, bis(2-ethyl-6-methyl-4-aminophenyl)methane, 2,2-bis(3-aminophenyl)propane and 2,2-bis(4-aminophenyl)propane; bis(aminophenoxy)benzene compounds, for example, 1,3-bis(3-aminophenoxy)benzene, 1,3-bis(4-aminophenoxy)benzene (TPE-R), and 1,4-bis(4-aminophenoxy)benzene; bis(aminophenoxyphenyl)propane compounds, for example, 2,2-bis[4-(4-aminophenoxy)phenyl]propane, 2,2-bis[4-(4-aminophenoxy)phenyl]hexafluoropropane and 2,2-bis[4-(3-aminophenoxy)phenyl]propane; and bis(aminophenoxy)diphenylsulfone compounds, for example, 4,4'-bis(4-aminophenoxy)diphenylsulfone, bis[4-(4-aminophenoxy)phenyl]sulfone, and bis[4-(3-aminophenoxy)phenyl]sulfone.

In the preparation of the unsaturated imide compounds (A), the reaction medium consists of at least one organic solvent selected from, for example, amide type solvent compounds, for example, N,N-dimethylacetamide, N,N-diethylacetamide, N,N-dimethylformamide, N,N-diethylformamide, N-methyl-2-pyrrolidone (NMP), N-methyl-captolactam; sulfur atom-containing solvent compounds, for example, dimethylsulfoxide, diethylsulfoxide, dimethylsulfone, diethylsulfone, hexamethylsulfonamide; phenol type solvent compounds, for example, cresol, phenol, and xylenol; oxygen atom-containing solvent compounds, for example, acetone, methyl alcohol, ethyl alcohol, ethyleneglycol, dioxane, and tetrahydrofuran; and other solvent compounds, for example, pyridine and tetramethylurea.

In the imide oligomer composition of the present invention, the unsaturated imide compound (A) preferably has a logarithmic viscosity number of 0.005 to 0.09, more preferably 0.01 to 0.08, still more preferably 0.01 to 0.05, determined in a concentration of 0.5 g/100 ml in a solvent consisting of N-methyl-2-pyrrolidone at a temperature of 30° C.

The unsaturated imide compound (A) having the above-mentioned logarithmic viscosity number exhibits a relatively low molecular weight and is fusible at a relatively low temperature of, for example, 30° C. to 170° C.

The terminal-modified imide oligomer (B) usable for the imide oligomer composition of the present invention consists of a polymerization and imidization product of (a) a carboxylic acid component comprising:
  (i) a first acid ingredient comprising at least one 2,3,3',4'-biphenyltetracarboxylic acid compound, and
  (ii) a second acid ingredient comprising at least one member selected from unsubstituted and substituted nadic anhydride,
with (b) a diamine component comprising at least one aromatic diamine.

The carboxylic acid component (a) is reacted with the diamine component (b) in a reaction medium consisting of at least one organic solvent. The carboxylic acid component (a) is used in a total carboxylic anhydride equivalent amount substantially equal to a total amino equivalent amount of the diamine component (b).

In the carboxylic acid component (a), the first acid ingredient (i) and the second acid ingredient (ii) are used preferably in a molar ratio of from 50:1 to 1:2, more preferably from 10:1 to 1:2.

The resultant terminal-modified imide oligomer (B) is provided with unsaturated hydrocarbon groups, for example, nadimide groups, having a double bond, located at the terminals of the oligomer molecule and at least one imide group, preperably, 2 or more imide groups, located in at least one inside portions, preferably two or more inside portion, of the oligomer molecule.

The terminal unsaturated hydrocarbon groups of the terminal-modified imide oligomer (B) exhibit a high addition reactive property.

The terminal-modified imide oligomer (B) is prepared, for example, by the following process.

The carboxylic acid component (a) and the diamine components (b) are reacted in a ratio of a total carboxylic anhydride equivalent to a total amino equivalent of about 1:1, in an organic reaction medium at a temperature of 100° C. or less, preferably 80° C. or less for 1 to 120 minutes, to provide an amide acid oligomer having an amide acid structure.

Then, the amide acid oligomer is subjected to a dehydration-imidization reaction by ($a_1$) treating with an imidizing agent, for example, acetic anhydride, at a relatively low temperature of 0° C. to 140° C. or ($a_2$) heating at a high temperature of 140° C. to 250° C., preferably 150° C. to 200° C. for 5 to 180 minutes.

The 2,3,3',4'-biphenyltetracarboxylic acid compounds usable for the terminal-modified imide oligomer (B) are selected from 2,3,3',4'-biphenyltetracarboxylic acid and dianhydride, lower alkyl esters and salts of the acid. A most preferable compound is 2,3,3',4'-biphenyltetracarboxylic anhydride.

The first acid ingredient (i) for the terminal-modified imide oligomer (B) comprises 70 to 100 molar %, preferably 80 to 100 molar %, more preferably 90 to 100 molar %, of at least one 2,3,3',4'-biphenyltetracarboxylic acid compound and 0 to 30 molar %, preferably 0 to 20 molar %, more preferably 0 to 10 molar %, of at least one member selected from the group consisting of aromatic tetracarboxylic dianhydrides other than 2,3,3',4'-biphenyltetracarboxylic dianhydride and aliphatic tetracarboxylic dianhydride.

The other aromatic tetracarboxylic dianhydride is preferably selected from 3,3',4,4'-benzophenonetetracarboxylic dianhydride, pyromellitic dianhydride, 2,2-bis(3,4-dicarboxyphenyl)methane dianhydride and bis(3,4-dicarboxyphenyl)ether dianhydride.

The aliphatic tetracarboxylic dianhydride is, for example, butane tetracarboxylic dianhydride.

The unsubstituted nadic anhydride usable for the second acid ingredient (ii) is preferably 5-norbornene-2,3-dicarboxylic anhydride.

The substituted nadic anhydride usable for the second acid ingredient (ii) is preferably selected from the same group of the compounds as those usable for the unsaturated imide compound (A).

The aromatic diamine usable for the terminal-modified imide oligomer (B) is preferably selected from the same group of the diamine compounds as those usable for the unsaturated imide compound (A).

The terminal-modified imide oligomer (B) has a logarithmic viscosity number of from 0.03 to 1.0, preferably from 0.04 to 0.8, more preferably from 0.05 to 0.2, determined in a concentration of 0.5 g/100 ml in a solvent consisting of N-methyl-2-pyrrolidone at a termperature of 30° C., and preferably exhibits a softening temperature of from 100° C. to 250° C., more preferably from 150° C. to 200° C.

Preferably, the terminal-modified imide oligomer (B) has a high compatibility with the unsaturated imide compound (A) and is in the state of a powdery solid at room temperature.

In the composition of the present invention, the unsaturated imide compound (A) is mixed in an amount of 100 parts by weight to 30 to 200 parts by weight, preferably 40 to 150 parts by weight, of the terminal-modified imide oligomer (B).

In the composition of the present invention, when the terminal-modified imide oligomer (B) is used in an amount of less than 30 parts by weight per 100 parts by weight of the unsaturated imide compound (A), and the resultant composition is used to produce a cured product, the resultant cured product has a plurality of voids and blisters formed in the surface portions thereof and exhibits a significantly poor mechanical properties. Also, the terminal-modified imide oligomer (B) is used in an excessively large amount, the resultant composition has an undesirably high melting temperature and exhibits a poor hot melt-shaping property. Therefore, the object of the present invention cannot be attained.

In the terminal-modified imide oligomer composition of the present invention, the unsaturated imide compound (A) and the terminal-modified imide oligomer (B) which are preferably in the state of a powdery solid, are uniformly mixed.

The terminal-modified imide oligomer composition of the present invention is optionally employed in the form of an uncured mixture, for example, a shaping material or binder, containing reinforcing fibers, a filler and/or a small amount of a thermoplastic resin, in addition to the unsaturated imide compound (A) and the terminal-modified imide oligomer (B).

Also, the terminal-modified imide oligomer composition of the present invention is optionally in the state of a solution in which the unsaturated imide compound (A) and the terminal-modified imide oligomer (B) are uniformly dissolved in an organic solvent.

In a method of producing a prepreg by using the terminal-modified imide oligomer composition of the present invention, a reinforcing fiber material is impregnated with the composition at a relatively low temperature, for example, by heating the composition at a temperature of about 150° C. This method is referred to as a hot melt method or a non-solvent dry method.

The reinforcing fiber material comprises at least one type of fibers selected from, for example, glass fibers, carbon fibers derived from polyacrylonitrile fibers, carbon fibers derived from pitch fibers, aramid fibers, alumina fibers, silicone carbide fibers and Se—Ti—C—O type fibers (available under a trademark of Tilano fiber, from UBE INDUSTRIES, LTD). The above-mentioned fibers can be used as a blend of two or more types of the fibers. The reinforcing fibers may be surface-treated or size-treated.

The filler preferably comprises at least one member selected from oxidation products of silicate compounds and silicon nitride salts, non-oxidized products, for example, silicon nitride and silicon carbide, and powdery substances, for example, graphite and polytetrafluoroethylene.

The thermoplastic resin is preferably selected from heat-resistant thermoplastic polymers, for example, polyetheretherketone resins, polysulfone resins, polyethersulfone resins, polyphenylenesuflide resins and polyetherimide resins.

The terminal-modified imide oligomer composition of the present invention can be used for the production of prepregs without empolying a solvent.

The terminal-modified imide oligomer composition of the present invention is usable for the production of shaped articles by a conventional shaping method, for example, a press-molding method, a transfer molding method or an injection molding method.

The prepregs produced by using the terminal-modified imide oligomer composition of the present invention are usable for producing composite materials by the following method.

The prepregs are produced by impregnating a reinforcing fiber material with the terminal-modified imide oligomer composition of the present invention. A plurality of the prepregs are laminated on each other and then heat-shaped at a temperature of 200° C. to 300° C. under a pressure of about 3 to 15 kg/cm$^2$ by a known method, for example, a reduced pressure bag/autoclave curing method, a hot press method or a sheet-winding method. During the heat-shaping procedure, the terminal-modified imide oligomer composition is cured to produce a fiber-reinforced composite material.

The above-mentioned impregnating (lay-up) procedure can be carried out while heating the composition at a temperature of 30° C. to 150° C., preferably 60° C. to 130° C. When the lay-up procedure is carried out within the above-mentioned temperature range, the resultant prepregs have a satisfactory tacking property and draping property and thus exhibit an enhanced processability.

In the resultant fiber-reinforced polyimide resin composite material, the volume content of the reinforcing fibers is preferably about 30 to 80% by volume, more preferably 40 to 70% by volume.

The cured resin from the terminal-modified imide oligomer composition of the present invention exhibits a thermal decomposition-starting temperature of 400° C. or more and a glass transition temperature (Tg) of 300° C. or more. Therefore the resultant composite material comprising the cured resin exhibits a superior heat resistance and an excellent mechanical strength, because the cured resin is reinforced by the reinforcing fibers.

The terminal-modified imide oligomer composition of the present invention is useful not only for the production of the fiber-reinforced composite materials, but also as a heat-resistant bonding material for bonding metal foils or other metallic materials, and as a resinous material for forming various shaped articles.

EXAMPLES

The present invention will be further explained by the following specific examples.

Preparation of Woven Fabric Prepregs

In the examples, prepregs were produced by the following procedures.

A terminal-modified imide oligomer composition was melted by heating at a temperature of 150° C. to 170° C. The melt of the composition was impregnated in a carbon fiber fabric (eight harness satin having a warp density of 945 yarns/m and a weft density of 945 yarns/m, available under the trademark of Besfite HTAN12K, from Toho Rayon K.K.). The resultant prepreg was smoothed by passing through heating rolls at a temperature of 130° C. to 150° C. The resultant prepreg was substantially free from volatile substances.

Production of Composite Materials

In the examples, composite materials were produced from a plurality of the prepregs by the following procedures.

The prepregs were cut into a plurality of rectangular pieces having a length of 26 mm, a width of 90 mm and a thickness of 160 μm.

Eight prepreg pieces were laminated on each other in the same direction (0° direction) as each other and pressed at a temperature of 150° C. The laminate was placed in an autoclave and heated to a temperature of 316° C. and maintained at this temperature for 3 hours.

After cooling to 80° C., the pressure of the autoclave was reduced to the ambient atmospheric pressure. The resultant shaped composite material was taken out from the autoclave. In the shaping operation of the shaped composite material, the highest shaping pressure was 8.5 kg/mm$^2$. Until the shaping operation was completed, the pressure in the bag was maintained at a reduced level of 5 mmHg or less.

The resultant shaped composite material was post-cured in air in an oven at a temperature of 320° C. for 16 hours.

The shaped pieces were cut into specimens having a length (in the direction parallel to the filament yarns) of 10 mm and a width (in a direction at a right angle to the filament yarn) of 57 mm, for dynamic viscoelasticity measurement. The specimens were subjected to a measurement of glass transition temperature (Tg) thereof.

Also, the shaped pieces were cut into specimens having a length of 14 mm in the direction of weft yarns and a width of 6.4 mm in the direction of warp yarns, for an interlaminar shear strength measurement, and into specimens having a length of 80 mm in the direction of warp yarns and a width of 25 mm in the direction of weft yarns, for measurement of flexural properties, for example, flexural strength and flexural modulus of elasticity.

These specimens were subjected to the interlaminar shear strength measurement and flexural property measurement.

Further, the shaped pieces were cut into specimens having a length and width of 35 mm, for measurements of volume fiber content and volume pore (void) content.

Logarithmic Viscosity Number

In the examples, the logarithmic viscosity number (η) of each terminal-modified imide oligomer was determined by measuring the viscosity of the solution of the oligomer in a concentration of 0.5 g/100 ml in a solvent consisting of N-methyl-2-pyrrolidone at a temperature of 30° C., by using a Canon Fenske Viscometer. The logarithmic viscosity number was calculated in accordance with the following equation:

$$\text{Logarithmic viscosity number } (\eta) = \frac{\ln(v/v_0)}{C}$$

wherein V represent the measured viscosity of the solution, $V_0$ represents a viscosity of the solvent and C represents the concentration of the oligomer in the solution.

Dynamic Viscosity

In the examples, a dynamic viscosity (η*) of each terminal-modified imide oligomer composition was measured by a parallel plate method, by using a mechanical spectrometer (available under the trademark: RDS-II, from Rheometric Co.) in which method a sample of the imide oligomer composition was placed on a disc having a diameter of 25 mm, and a specific vibration was applied to the sample under a stress of 20% at a frequency of 1 Hz at a temperature of 150° C. for 30 minutes.

Glass Transition Temperature

In the examples, the glass-transition temperature (Tg) of a cured resin material was measured by using the above-mentioned mechanical spectrometer (RD5-II).

A cured composite material to be subjected to the glass transition temperature test was prepared in the following manner. A laminate was prepared by laminating 8 pieces of carbon fiber fabric prepregs impregnated with a terminal-modified imide oligomer composition, on each other. The laminate was molded in an autoclave at a temperature of 316° C. for 3 hours and then post cured in the air atmosphere at a temperature of 320° C. for 16 hours.

To the cured composite material, a torsional oscillation was applied under a maximum stress of 0.05% of a frequency of 1 Hz, while applying a bending load in a direction in parallel to the filament yarns. A dynamic viscoelasticity of the cured composite material was measured. The glass-transition temperature (Tg) of the cured composite material was determined from a peak temperature of dynamic loss elastic modulus (G") in a rigidity-temperature curve obtained by the measurement.

Interlaminar Shear Strength

Tester: Instron 1185, made by Instron
Ratio of span to thickness of specimen: 4
Velocity of cross head: 2 mm/min
Measurement temperature: 23° C., 300° C.
Measurement humidity: 50% RH (ASTM 2344)

Flexural Strength and Modulus of Electricity

Tester: Instron 1185, made by Instron
Ratio of span to thickness of specimen: 32
Cross head velocity: 2 mm/min
Measurement temperature: 23° C., 300° C.
Measurement humidity: 50% RH (ASTM 790)

Volume Fiber Content

The matrix in the composite material was dissolved in a mixture solution of a concentrated sulfuric acid with hydrogen peroxide. The weight content of the reinforcing fibers in the composite material was determined. Also, the density of the composite material was measured in accordance with ASTM D3171. From the obtained data, the volume fiber content of the composite material was calculated.

Volume Pore Content

The volume pore content of the composite material was calculated by substract a total of the volume fiber content and a volume resin content which was calculated from the volume fiber content, from 100.

Preparation Example 1

Preparation of an Unsaturated Imide Compound (A-1)

A glass flask having a capacity of one liter and equipped with a thermometer, inlet, outlet and stirrer was charged with a mixture consisting of:

(a) 89.095 g of methyl-5-norbornene-2,3-dicarboxylic anhydride
(b) 50.060 g of 3,4-diaminodiphenylether, and
(c) 303.0 g of N-methyl-2-pyrrolidone (NMP).

The resultant reaction mixture in the flask was agitated at a temperature of 50° C. for one hour, while flowing a nitrogen gas through the flask, to prepare an amic acid oligomer. Then, the obtained reaction solution was heated to raise the temperature of the solution to 185° C., and maintained at this temperature for 1 hour while agitating, to provide an unsaturated imide compound (A-1).

The obtained reaction solution was cooled to a room temperature (about 25° C.), and the cooled solution was poured into water to allow the unsaturated resultant imide compound (A-1) to deposit in the state of a solid powder. The unsaturated imide compound (A-1) powder was collected by a filtration. The collected powder was dried under a reduced pressure. The resultant unsaturated imide compound (A-1) was in the form of a powdery solid and had a molecular weight of 521.

Preparation Example 2

Preparation of an Unsaturated Imide Compound (A-2)

The same procedures as in Preparation Example 1 were carried out, with the following exceptions.

The reaction mixture consisted of:

(a) 89.095 g of methyl-5-norbornene-2,3-dicarboxylic anhydride
(b) 50.060 g of 4,4'-diaminodiphenylether, and
(c) 303.0 g of N-methyl-2-pyrrolidone (NMP).

The resultant unsaturated imide compound (A-2) was in the form of a powdery solid, and had a molecular weight of 521.

Preparation Example 3

Preparation of an Unsaturated Imide Compound (A-3)

The same procedures as in Preparation Example 1 were carried out, with the following exceptions.

The reaction mixture consistent of:

(a) 89.095 g of methyl-5-norbornene-2,3-dicarboxylic anhydride
(b) 73.085 g of 1,3-bis(4-aminophenoxy)benzene, and
(c) 358.0 g of N-methyl-2-pyrrolidone (NMP).

The resultant unsaturated imide compound (A-3) was in the form of a powdery solid, and had a molecular weight of 613.

Preparation Example 4

Preparation of an Unsaturated Imide Compound (A-4)

The same procedures as in Preparation Example 1 were carried out, with the following exceptions. The reaction mixture consisted of:

(a) 82.08 g of 5-norbornene-2,3-dicarboxylic anhydride
(b) 50.060 g of 3,4'-diaminodiphenylether, and
(c) 288.0 g of N-methyl-2-pyrrolidone (NMP).

The resultant unsaturated imide compound (A-4) was in the form of a powdery solid, and had a molecular weight of 493.

Preparation Example 5

Preparation of an Unsaturated Imide Compound (A-5)

The same procedures as in Preparation Example 1 were carried out, with the following exceptions.

The reaction mixture consisted of:

(a) 82.080 g of 5-norbornene-2,3-dicarboxylic anhydride
(b) 50.060 g of 4,4'-diaminodiphenylether, and
(c) 288.0 g of N-methyl-2-pyrrolidone (NMP).

The resultant unsaturated imide compound (A-5) was in the form of a powdery solid, and had a molecular weight of 493.

Preparation Example 6

Preparation of an Unsaturated Imide Compound (A-6)

The same procedures as in Preparation Example 1 were carried out, with the following exceptions.

The reaction mixture consisted of:

(a) 82.080 g of 5-norbornene-2,3-dicarboxylic anhydride
(b) 73.085 g of 1,3-bis(4-aminophenoxy)benzene, and
(c) 341.0 g of N-methyl-2-pyrrolidone (NMP).

The resultant unsaturated imide compound (A-6) was in the form of a powdery solid, and had a molecular weight of 585.

Preparation Example 7

Preparation of Terminal-modified Imide Oligomer (B-1)

A glass flask having a capacity of one liter and equipped with a thermometer, inlet, outlet and stirrer was charged with a mixture consisting of:

(a) 29.422 g of 2,3,3',4'-biphenyltetracarboxylic dianhydride (a-BPDA)
(b) 40.048 g of 3,4'-diaminodiphenylether
(c) 35.638 g of methyl-5-norbornene-2,3-dicarboxylic anhydride, and
(d) 294.0 g of N-methyl-2-pyrrolidone (NMP).

The resultant reaction mixture in the flask was agitated at a temperature of 50° C. for one hour, while flowing a nitrogen gas through the flask, to prepare an amic acid oligomer. Then, the obtained reaction solution was heated to raise the temperature of the solution to 185° C., and maintained at this temperature for 1 hour while agitating, to provide a terminal-modified imide oligomer (B-1).

The obtained reaction solution was cooled to a room temperature (about 25° C.), and the cooled solution was poured into water to allow the resultant terminal-modified imide oligomer (B-1) to deposit in the state of a solid powder. The resultant terminal-modified imide oligomer powder was collected by a filtration. The collected powder was dried under a reduced pressure. The resultant terminal-modified imide oligomer (B-1) was in the form of a powder and had a logarithmic viscosity number ($\eta$) of 0.056.

Preparation Example 8

Preparation of a Terminal-modified Imide Oligomer (B-2)

The same procedures as in Preparation Example 7 were carried out, with the following exceptions.

The reaction mixture consisted of:

(a) 29.422 g of 2,3,3',4'-biphenyltetracarboxylic dianhydride
(b) 40.048 g of 4,4'-diaminodiphenylether
(c) 35.638 g of methyl-5-norbornene-2,3-dicarboxylic anhydride, and
(d) 294.0 g of N-methyl-2-pyrrolidone (NMP).

The resultant terminal-modified imide oligomer (B-2) was in the form of a powder, and exhibited the logarithmic viscosity number ($\eta$) of 0.056.

Preparation Example 9

Preparation of a Terminal-modified Imide Oligomer (B-3)

The same procedures as in Preparation Example 7 were carried out, with the following exceptions.

The reaction mixture consisted of:

(a) 29.422 g of 2,3,3',4'-biphenyltetracarboxylic dianhydride
(b) 58.468 g of 1,3-bis(4-aminophenoxy)benzene
(c) 35.638 g of methyl-5-norbornene-2,3-dicarboxylic anhydride, and
(d) 348.0 g of N-methyl-2-pyrrolidone (NMP).

The resultant terminal-modified imide oligomer (B-3) was in the form of a powder, and exhibited the logarithmic viscosity number ($\eta$) of 0.067.

Preparation Example 10

Preparation of a Terminal-modified Imide Oligomer (B-4)

The same procedures as in Preparation Example 7 were carried out, with the following exceptions.

The reaction mixture consisted of:

(a) 29.422 g of 2,3,3',4'-biphenyltetracarboxylic dianhydride (a-BPDA)
(b) 30.036 g of 3,4-diaminodiphenylether
(c) 17.819 g of methyl-5-norbornene-2,3-dicarboxylic anhydride, and
(d) 288.0 g of N-methyl-2-pyrrolidone (NMP).

The resultant terminal-modified imide oligomer (B-4) was in the form of a powder, and exhibited the logarithmic viscosity number ($\eta$) of 0.077.

Preparation Example 11

Preparation of a Terminal-modified Imide Oligomer (B-5)

The same procedures as in Preparation Example 7 were carried out, with the following exceptions.

The reaction mixture consisted of:

(a) 29.422 g of 2,3,3',4'-biphenyltetracarboxylic dianhydride
(b) 40.048 g of 3,4'-diaminodiphenylether (c) 32.832 g of 5-norbornene-2,3-dicarboxylic anhydride, and (d) 285.0 g of N-methyl-2-pyrrolidone (NMP).

The resultant rigid, terminal-modified imide oligomer was in the form of a powder, and exhibited the logarithmic viscosity number ($\eta$) of 0.053.

Preparation Example 12

Preparation of a Terminal-modified Imide Oligomer (B-6)

The same procedures as in Preparation Example 7 were carried out, with the following exceptions.

The reaction mixture consisted of:

(a) 29.422 g of 2,3,3',4'-biphenyltetracarboxylic dianhydride (b) 40.048 g of 4,4'-diaminodiphenylether (c) 32.832 g of 5-norbornene-2,3-dicarboxylic anhydride, and (d) 285.0 g of N-methyl-pyrrolidone (NMP).

The resultant terminal-modified imide oligomer (B-6) was in the form of a powder, and exhibited the logarithmic viscosity number ($\eta$) of 0.053.

Preparation Example 13

Preparation of a Terminal-modified Imide Oligomer (B-7)

The same procedures as in Preparation Example 7 were carried out, with the following exceptions.

The reaction mixture consisted of:

(a) 21.812 g of pyromellitic dianhydride (b) 40.048 g of 4,4'-diaminodiphenylether (c) 35.638 g of methyl-5-norbornene-2,3-dicarboxylic dianhydride, and (d) 271.0 g of N-methyl-2-pyrrolidone (NMP).

The resultant terminal-modified imide oligomer (B-7) was in the form of a powder, and exhibited the logarithmic viscosity number ($\eta$) of 0.051.

Referential Example 1

Preparation of a Comparative Terminal-modified Imide Oligomer Composition (C-1)

A glass flask having a capacity of one liter and equipped with a thermometer, inlet, outlet and a stirrer was charged with a mixture consisting of:

(a) 29.422 g of 2,3,3',4'-biphenyltetracarboxylic dianhydride (b) 127.844 g of 3,4'-diaminodiphenylether (c) 191.893 g of methyl-5-norbornene-2,3-dicarboxylic anhydride, and (d) 978.0 g of N-methyl-2-pyrrolidone (NMP).

The resultant reaction mixture in the flask was agitated at a temperature of 50° C. for one hour, while flowing a nitrogen gas through the flask, to prepare an amic acid oligomer. Then, the obtained reaction solution was heated to raise the temperature of the solution to 185° C., and maintained at this temperature for 1 hour while agitating, to provide a terminal-modified imide oligomer composition (C-1).

The obtained reaction solution was cooled to a room temperature (about 25° C.), and the cooled solution was poured into water to allow the resultant imide oligomer composition (C-1) to deposit in the state of a solid powder. The imide oligomer powder was collected by a filtration. The collected powder was dried under a reduced pressure. A comparative terminal-modified imide oligomer composition (C-1) in the form of a powder was obtained. This comparative composition (C-1) will be used for Comparative Example 10 in comparison with Example 1.

Referential Example 2

Preparation of a Comparative Terminal-modified Imide Oligomer Composition (C-2)

A glass flask with a capacity of 2 liters and equipped with a thermometer, inlet, outlet and stirrer was charged with a mixture consisting of:

(a) 29.422 g of 2,3,3',4'-biphenyltetracarboxylic dianhydride (b) 73.934 g of 3,4'-diaminodiphenylether (c) 95.947 g of methyl-5-norbornene-2,3-dicarboxylic anhydride, and (d) 740.0 g of N-methyl-2-pyrrolidone (NMP).

The resultant reaction mixture in the flask was agitated at a temperature of 50° C. for one hour, while flowing a nitrogen gas through the flask, to prepare an amic acid oligomer. Then, the obtained reaction solution was heated to raise the temperature of the solution to 185° C., and maintained at this temperature for 1 hour while agitating, to provide a comparative terminal-modified imide oligomer composition (C-2).

The obtained reaction solution was cooled to a room temperature (about 25° C.), and the cooled solution was poured into water to allow the resultant composition (C-2) to deposit in the state of a solid powder. The composition (C-2) powder was collected by a filtration. The collected powder was dried under a reduced pressure. The resultant comparative terminal-modified imide oligomer composition was in the form of a powder and will be used for comparative Example 11 in comparison with Example 9.

Examples 1 to 10

In each of Examples 1 to 10, a terminal-modified imide oligomer composition was prepared from the unsaturated imide compound and the terminal-modified imide oligomer the type and amount of which are as shown in Table 1.

The resultant composition was subjected to the measurement of dynamic viscosity [$\eta^*$] by the above-mentioned parallel plate method. Also, the resultant cured composite material was subjected to the measurement of glass transition temperature (Tg) in the above-mentioned manner.

The results of the measurements are shown in Table 1.

TABLE 1

| | | Terminal-modified imide oligomer composition | | | | | |
|---|---|---|---|---|---|---|---|
| | Unsaturated imide compound (A) | | Terminal-modified imide oligomer (B) | | | Dynamic viscosity | Glass transition |
| Example No. | Type | Amount (part by wt) | Type | Logarithmic viscosity number [η] | Amount (part by wt) | [η*] of composition at 150° C. [poise] | point of cured composite material (Tg) (°C.) |
| 1 | A-1 | 100 | B-1 | 0.056 | 43 | $3.0 \times 10^2$ | 343 |
| 2 | A-1 | 100 | B-1 | 0.056 | 100 | $2.0 \times 10^3$ | 342 |
| 3 | A-1 | 100 | B-1 | 0.056 | 50 | $3.9 \times 10^3$ | 346 |
| | | | B-5 | 0.053 | 30 | | |
| 4 | A-1 | 100 | B-1 | 0.056 | 150 | $3.0 \times 10^3$ | 342 |
| 5 | A-2 | 100 | B-5 | 0.053 | 43 | $3.6 \times 10^2$ | 356 |
| 6 | A-3 | 100 | B-1 | 0.056 | 43 | $3.3 \times 10^2$ | 342 |
| 7 | A-3 | 100 | B-2 | 0.056 | 43 | $3.4 \times 10^2$ | 343 |
| 8 | A-3 | 100 | B-3 | 0.067 | 100 | $4.0 \times 10^3$ | 340 |
| 9 | A-1 | 100 | B-4 | 0.077 | 60 | $5.0 \times 10^3$ | 341 |
| 10 | A-2 | 100 | B-6 | 0.053 | 50 | $3.9 \times 10^3$ | 364 |

| | Performance of Composite material | | | | | | | |
|---|---|---|---|---|---|---|---|---|
| | Interlaminar shear strength (kg/mm²) | | Flexural strength (kg/mm²) | | Flexural modulus of elasticity (t/mm²) | | Volume fiber content | Volume pore content |
| Example No. | 23° C. | 300° C. | 23° C. | 300° C. | 23° C. | 300° C. | (vol %) | |
| 1 | 5.0 | 4.9 | 93 | 74 | 6.6 | 6.5 | 55 | 0.3 |
| 2 | 4.9 | 4.8 | 93 | 74 | 6.6 | 6.5 | 54 | 0.4 |
| 3 | 4.9 | 4.9 | 93 | 74 | 6.7 | 6.6 | 54 | 0.3 |
| 4 | 4.9 | 4.9 | 93 | 75 | 6.5 | 6.4 | 54 | 0.2 |
| 5 | 5.0 | 4.9 | 93 | 75 | 6.6 | 6.6 | 53 | 0.3 |
| 6 | 4.9 | 4.9 | 93 | 74 | 6.5 | 6.4 | 53 | 0.4 |
| 7 | 4.9 | 4.9 | 93 | 74 | 6.6 | 6.5 | 54 | 0.3 |
| 8 | 4.9 | 4.8 | 92 | 74 | 6.5 | 6.4 | 53 | 0.3 |
| 9 | 4.9 | 4.8 | 93 | 74 | 6.6 | 6.5 | 54 | 0.4 |
| 10 | 5.0 | 5.0 | 93 | 75 | 6.7 | 6.8 | 53 | 0.3 |

Comparative Examples 1 to 9

In each of Comparative Examples 1 to 9, a terminal-modified imide oligomer composition was prepared by mixing the unsaturated imide compounds (A) with the terminal-modified imide oligomer (B) of the type and in the amount as shown in Table 2.

The composition exhibited too high a melt viscosity and thus the dynamic viscosity of the composition could not be determined.

Also, due to the too high melt viscosity of the composition, the specimens for the glass transition temperature measurement could not be prepared, and thus the glass transition temperature could not be determined.

The results are shown in Table 2.

Comparative Examples 10 and 11

In Comparative Examples 10 and 11, the comparative terminal imide oligomer compositions (C-1) and (C-2) prepared in Referential Examples 1 and 2 were employed, respectively.

The comparative terminal imide oligomer composition was prepared in a single reaction step and thus include undesirable compounds having no terminal unsaturated groups. Therefore, the cured resins of the comparative composition had a clearly lower glass transition temperature than those of the present invention, and thus exhibited a poor heat resistance.

The results are shown in Table 2.

TABLE 2

| Comparative Example No. | Terminal-modified imide oligomer composition ||||| Dynamic viscosity [η*] of composition at 150° C. [poise] | Glass transition point of cured composite material (Tg) (°C.) |
|---|---|---|---|---|---|---|---|
| | Unsaturated imide compound (A) || Terminal-modified imide oligomer (B) ||| | |
| | Type | Amount (part by wt) | Type | Logarithmic viscosity number [η] | Amount (part by wt) | | |
| 1 | A-4 | 100 | B-5 | 0.053 | 100 | *1 | *1 |
| 2 | A-4 | 100 | B-5 | 0.053 | 43 | *1 | *1 |
| 3 | A-4 | 100 | B-5 | 0.053 | 20 | *1 | *1 |
| 4 | A-4 | 100 | B-1 | 0.056 | 43 | *1 | *1 |
| 5 | A-5 | 100 | B-1 | 0.056 | 43 | *1 | *1 |
| 6 | A-6 | 100 | B-1 | 0.056 | 43 | *1 | *1 |
| 7 | A-1 | 100 | B-7 | 0.051 | 43 | *1 | *1 |
| 8 | — | — | B-1 | 0.056 | 100 | *1 | *1 |
| 9 | — | — | B-6 | 0.053 | 100 | *1 | *1 |
| 10 | C-1 | — | — | — | — | $2.8 \times 10^2$ | 323 |
| 11 | C-2 | — | — | — | — | $4.8 \times 10^3$ | 321 |

| Comparative Example No. | Performance of Composite material ||||||||
|---|---|---|---|---|---|---|---|---|
| | Interlaminar shear strength (kg/mm$^2$) || Flexural strength (kg/mm$^2$) || Flexural modulus of elasticity (t/mm$^2$) || Volume fiber content (Vol %) | Volume pore content (Vol %) |
| | 23° C. | 300° C. | 23° C. | 300° C. | 23° C. | 300° C. | | |
| 1 | *1 | *1 | *1 | *1 | *1 | *1 | *1 | *1 |
| 2 | *1 | *1 | *1 | *1 | *1 | *1 | *1 | *1 |
| 3 | *1 | *1 | *1 | *1 | *1 | *1 | *1 | *1 |
| 4 | *1 | *1 | *1 | *1 | *1 | *1 | *1 | *1 |
| 5 | *1 | *1 | *1 | *1 | *1 | *1 | *1 | *1 |
| 6 | *1 | *1 | *1 | *1 | *1 | *1 | *1 | *1 |
| 7 | *1 | *1 | *1 | *1 | *1 | *1 | *1 | *1 |
| 8 | *1 | *1 | *1 | *1 | *1 | *1 | *1 | *1 |
| 9 | *1 | *1 | *1 | *1 | *1 | *1 | *1 | *1 |
| 10 | 4.3 | 2.6 | 87 | 44 | 5.7 | 2.9 | 55 | 0.8 |
| 11 | 4.3 | 2.7 | 85 | 41 | 5.4 | 3.0 | 54 | 0.9 |

Note: *1 . . . Could not be determined

As Tables 1 and 2 clearly show, the terminal-modified imide oligomer composition of the present invention comprising an unsaturated imide compound (A) and the terminal-modified imide oligomer (B) in a specific mixing proportion, is usable for producing shaped articles by a hot melt method. Also, the specific imide oligomer composition of the present invention is easily curable within a relatively short time. The resultant cured resin articles exhibit a high heat resistance and a satisfactory mechanical strength, particularly at a high temperature.

Also, the specific imide oligomer composition of the present invention is useful as a binder resin, a matrix resin for various composite resin materials coutaining reinforcing fibers and/or filler particles, and a resin material for various shaped articles, and thus can be widely utilized, for example, in aircraft, space industrial machines and devices, and devices and machines for vehicles.

We claim:

1. A terminal-modified imide oligomer composition comprising:

(A) 100 parts by weight of an unsaturated imide compound consisting of a reaction product of a substituted nadic anhydride with an aromatic diamine and provided with unsaturated hydrocarbon groups located at terminals of the compound molecule and an imide group located in an inside portion of the compound molecule; and (B) 30 to 200 parts by weight of a terminal-modified imide oligomer consisting of a polymerization and imidization product of (a) a carboxylic acid component comprising (i) a first acid ingradient comprising at least one 2,3,3',4'-biphenyltetracarboxylic acid compound and (ii) a second acid ingredient comprising at least one member selected from the group consisting of nadic anhydride and substituted nadic anhydrides, with (b) a diamine component comprising at least one aromatic diamine, provided with unsaturated hydrocarbon groups located at the terminals of the oligomer molecule and at least one imide group located in at least one inside portion of the oligomer molecule, and having a logarithmic viscosity number of 0.03 to 1.0 determined in a concentration of 0.5 g/100 ml in a solvent consisting of N-methyl-2-pyrrolidone at a temperature of 30° C.

2. The terminal-modified imide oligomer composition as claimed in claim 1, wherein the substituted nadic anhydride has at least one substituent selected from lower alkyl groups having 1 to 6 carbon atoms, alkoxyl groups, halogenated hydrocarbon groups, and halogen atoms, and attached to a norbornene structure of a nadic anhydride molecule at at least one position other than 2- and 3-portions thereof.

3. The terminal-modified imide oligomer composition as claimed in claim 1, wherein the substituted nadic anhydride is selected from the group consisting of methyl-5-norbornene-2,3-dicarboxylic anhydride, ethyl-5-norbornene-2,3-dicarboxylic anhydride, methoxy-5-norbornene-2,3-dicarboxylic anhydride, trifluoromethyl-5-norbornene-2,3-dicarboxylic anhydride, fluoro-5-norbornene-2,3-dicarboxylic anhydride and chloro-5-norbornene-2,3-dicarboxylic anhydride.

4. The terminal-modified imide oligomer composition as claimed in claim 1, wherein the aromatic diamine for the unsaturated imide compound (A) and the imide oligomer (B) is selected from the group consisting of phenylene diamine compounds, xylylene diamine compounds, diamino-trialkylbenzene compounds, benzidine compounds, diaminodiphenylether compounds, diaminodiphenylthioether compounds, diaminobenzophenone compounds, diaminodiphenylsulfine compounds, diaminodiphenylsulfide compounds, diaminodiphenylsulfone compounds, diaminodiphenylalkane compounds, bis(aminophenoxy)benzene compounds, bis[(aminophenoxy)phenyl]propane compounds, and bis(aminophenoxy)diphenylsulfone compounds.

5. The terminal-modified imide oligomer composition as claimed in claim 1, wherein the unsaturated imide compound (A) has a logarithmic viscosity number of 0.005 to 0.09, determined in a concentration of 0.5 g/100 ml in a solvent consisting of N-methyl-2-pyrrolidone at a temperature of 30° C.

6. The terminal-modified imide oligomer composition as claimed in claim 1, wherein the 2,3,3',4'-biphenyltetracarboxylic acid compound is selected from the group consisting of 2,3,3',4'-biphenyltetracarboxylic acid and dianhydride, lower alkyl esters and salts of the acid.

7. The terminal-modified imide oligomer composition as claimed in claim 1, wherein in the carboxylic acid component (a), the first acid ingredient (i) and the second acid ingredient (ii) are in a molar ratio of from 50:1 to 1:2.

8. The terminal-modified imide oligomer composition as claimed in claim 1, wherein the first acid ingredient (i) comprises 70 to 100 molar % of at least one 2,3,3',4'-biphenyltetracarboxylic acid compound and 0 to 30 molar % of at least one member selected from the group consisting of aromatic tetracarboxylic dianhydrides other than 2,3,3',4'-biphenyltetracarboxylic dianhydride and aliphatic tetracarboxylic dianhydrides.

9. The terminal-modified imide oligomer composition as claimed in calim 1, wherein nadic anhydride for the terminal-modified imide oligomer (B) is 5-norbornene-2,3-dicarboxylic anhydride.

* * * * *